United States Patent [19]

Naito et al.

[11] Patent Number: 5,740,318
[45] Date of Patent: Apr. 14, 1998

[54] SPEECH ENDPOINT DETECTION METHOD AND APPARATUS AND CONTINUOUS SPEECH RECOGNITION METHOD AND APPARATUS

[75] Inventors: Masaki Naito, Tokyo; Shingo Kuroiwa, Fujimi; Kazuya Takeda, Nagoya; Seiichi Yamamoto, Urawa, all of Japan

[73] Assignee: Kokusai Denshin Denwa Co., Ltd., Tokyo, Japan

[21] Appl. No.: 534,805

[22] Filed: Sep. 27, 1995

[30] Foreign Application Priority Data

Oct. 18, 1994 [JP] Japan ................ 6-251773

[51] Int. Cl.⁶ ............................. G10L 5/06
[52] U.S. Cl. ............ 395/2.62; 395/2.64; 395/2.57
[58] Field of Search ................ 395/2.62, 2.65, 395/2.54, 2.48, 2.47, 2.5, 2.42, 2.6, 2.63, 2.64, 2.41, 2.19, 2.57, 2.59, 2.24

[56] References Cited

U.S. PATENT DOCUMENTS

| 4,624,008 | 11/1986 | Vensko et al. ............ 395/2.66 |
| 4,718,095 | 1/1988 | Asakawa et al. ............ 395/2.6 |
| 4,783,806 | 11/1988 | Nakamura et al. ............ 395/2.48 |
| 4,811,399 | 3/1989 | Landell et al. ............ 395/2.62 |
| 4,821,325 | 4/1989 | Martin et al. ............ 395/2.62 |
| 4,975,962 | 12/1990 | Oka ............ 395/2.5 |
| 5,040,127 | 8/1991 | Gerson ............ 395/2.64 |
| 5,293,452 | 3/1994 | Picone et al. ............ 395/2.65 |
| 5,295,190 | 3/1994 | Yamashita et al. ............ 295/2.57 |
| 5,444,817 | 8/1995 | Takizawa ............ 395/2.63 |
| 5,509,104 | 4/1996 | Lee et al. ............ 395/2.65 |
| 5,526,466 | 6/1996 | Takizawa ............ 395/2.62 |
| 5,579,431 | 11/1996 | Reaves ............ 395/2.57 |

Primary Examiner—Allen R. MacDonald
Assistant Examiner—Richemond Dorvil

[57] ABSTRACT

A speech endpoint detection unit determines that a first condition is met when a matching score of a partial sentence accepted by a grammatical rule unit is the highest of all partial sentences, and that a second condition is met when a duration time of input speech determined to coincide with a silent standard pattern is longer than a predetermined time. A speech endpoint is determined when the first and second conditions are both met and a speech endpoint detection signal is sent to a word prediction unit and a recognition result output unit. By requiring that both first and second conditions be met, a speech endpoint can correctly be detected even when a long silent period is present in the course of a sentence.

11 Claims, 10 Drawing Sheets

First Embodiment

FIG. 2
Example of Grammatical Rule

Mr. — Yano — of — general — affairs — dept. — please — (silence)

Structure of Speech Endpoint Detection Unit

Structure of Speech Endpoint Detection Unit

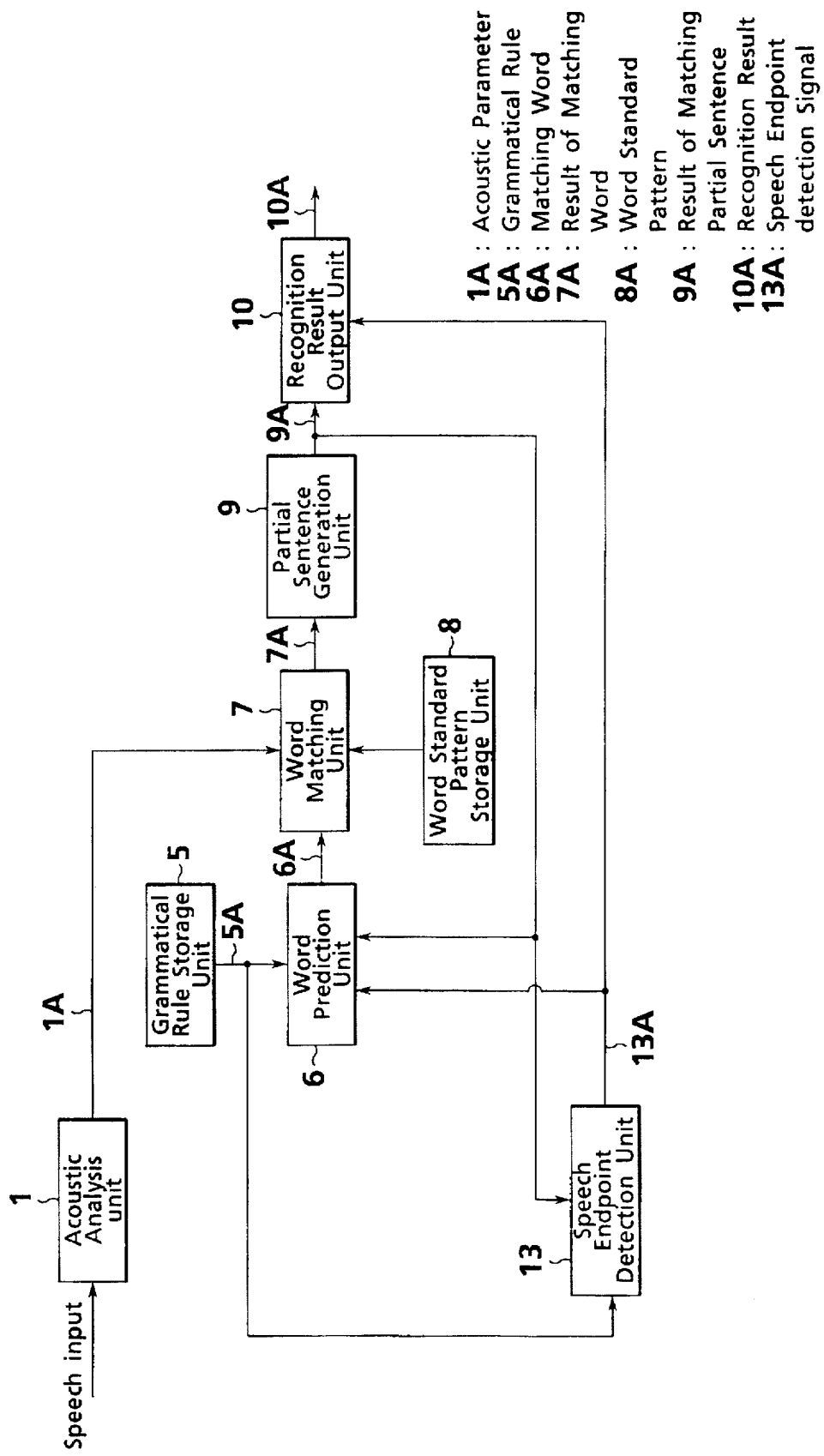

Partial Sentence HMM

Six Word HMM

Partial Sentence and Matching Score

Description of Silent Duration Time Calculation

和名: 
SPEECH ENDPOINT DETECTION METHOD AND APPARATUS AND CONTINUOUS SPEECH RECOGNITION METHOD AND APPARATUS

FIELD OF THE INVENTION

This invention relates to a technology for recognizing a continuous speech, specifically to a technology for detecting an end time which is useful for improving the accuracy of speech recognition in man-machine interface by a phonetic language.

BACKGROUND OF THE INVENTION

In a conventional speech recognition apparatus, when a speech signal is input, a speech period is detected based on the power of the input speech, in thus obtained speech period, a word standard pattern is continuously compared with the input speech according to a grammatical rule to recognize the continuous speech.

As shown in FIG. 9, the conventional speech recognition apparatus of this kind comprises an acoustic analysis unit 1, an acoustic parameter delay unit 2, a speech startpoint detection unit 3, a speech endpoint detection unit 4, a grammatical rule storage unit 5, a word prediction unit 6, a word matching unit 7, a word standard pattern storage unit 8, a partial sentence generation unit 9, a recognition result output unit 10, a speech period detection switch 11, and a power of speech calculation unit 12, mainly achieved by a central processing unit (CPU) and software.

Referring to FIG. 9, the grammatical rule storage unit 5 of the continuous speech recognition apparatus is previously stored with various grammatical rules utilized in recognition, and the word standard pattern storage unit 8 previously stores standard patterns of various words. Further, the switch 11 is previously connected to the speech startpoint detection unit 3 side. With the above arrangement, the continuous speech recognition apparatus makes recognition using the following procedures.

(1) The power of speech calculation unit 12 calculates moment by moment the power of input speech, and sends the result 12A to the speech startpoint detection unit 3 through the switch 11. In this case, the switch 11 is first connected to the speech startpoint detection unit 3 as shown above, at the time a speech startpoint detection signal 3A is received, is connected to the speech endpoint detection unit 4 side, is switched back to the speech startpoint detection unit 3 side at the time a speech endpoint detection signal 4A is received from the speech endpoint detection unit 4, and sends a speech power calculation result 12A to the individual connected sides.

(2) The speech startpoint detection unit 3 compares the speech power sent from the power of speech calculation unit 12 with a threshold value TH1 as shown in FIG. 10, and when the threshold value TH1 is exceeded for more than a predetermined time t1, sends the speech startpoint detection signal 3A to the switch 11 and the word prediction unit 6.

(3) On the other hand, the speech endpoint detection unit 4 compares the speech power sent from the power of speech calculation unit 12 with a threshold value TH2 as shown in FIG. 10, and when the speech power is below the threshold value TH2 for more than a predetermined time t2, sends the speech endpoint detection signal 4A to the word prediction unit 6 and the recognition result output unit 10 so that collation is made to the time when the speech power is first below the threshold value.

(4) The acoustic analysis unit 1 makes moment by moment acoustic analysis to extract a characteristic parameter of input speech, and sends the result (acoustic parameter) 1A the acoustic parameter delay unit 2.

(5) The acoustic parameter delay unit 2 delays the acoustic parameter 1A sent from the acoustic analysis unit 1 by a time t1 required in the Speech star%point detection unit 3 from the actual speech transmission by the user to the transmission of the speech star%point detection signal 3A, and sends the result 2A to the word matching unit 7.

(6) The word prediction unit 6 determines one or more words to be collated in the word matching unit 7, that is, matching words 6A, from a result of matching the partial sentence (partial sentence and its matching score) 9A sent from the partial sentence generation unit 9 and the grammatical rule 5A stored in the grammatical rule storage unit 5, and sends them to the word matching unit 7. Processing of the word prediction unit 6 is started from the time when the speech startpoint detection signal 3A is received from the speech startpoint detection unit 3, and continued until the speech endpoint detection signal 4A is received from the speech endpoint detection unit 4.

(7) The word matching unit 7 reads the word standard pattern corresponding to the matching word 6A received from the word prediction unit 6, that is, the word standard pattern 8A from the word standard pattern storage unit 8, calculates matching score of the delayed acoustic parameter 2A and the obtained word standard pattern 8A, and sends the result of word matching 7A, for the words calculated matching score to the end of the word standard pattern, to the partial sentence generation unit 9.

Calculation method of the matching score used for the matching in the word matching unit 7 includes, as already known, a DP matching method, and a method using Hidden Markov Model (HMM). (See Seiichi Nakagawa: "Speech Recognition by Probability Model", Electronic Information Communication Society.)

(8) The partial sentence generation unit 9 determines the individual partial sentence and its matching score from the word matching result 7A sent from the word matching unit 7, and sends the result 9A to the word prediction unit 6 and the recognition result output unit 10.

(9) The recognition result output unit 10, after the speech endpoint detection signal 4A is received from the speech endpoint detection unit 4, outputs the sentence of the highest matching score of all the partial sentence matching result 9A sent from the partial sentence generation unit 9, as a recognition result 10A.

However, since in the above conventional technology, the speech period is determined by the threshold value of speech power, a detection error of speech period tends to be generated when the input speech level is low, resulting in a degraded performance of speech recognition.

Further, since speech endpoint is determined to output the speech endpoint detection signal when speech power is below the threshold value for more than a predetermined time t2, if a long silent section is generated in a sentence, the speech period is determined to be ended even in the course of the sentence, and the input part of sentence is incorrectly matched with the standard pattern of the entire sentence, resulting in a degraded speech recognition performance.

A primary object of the present invention is to provide a speech endpoint detection method and a speech endpoint detection apparatus and a continuous speech recognition method and apparatus, which eliminate the above problems.

SUMMARY OF THE INVENTION

In a speech endpoint detection method according to a first aspect of the present invention, which attains the above object, end of speech is determined using a matching score and structure analysis result of a partial sentence obtained from a result of matching an input speech with a word standard pattern, and a duration time of an input speech determined to coincide with a silent standard pattern.

In particular, a speech endpoint detection method according to a second aspect of the present invention is characterized in that, a determination is made as to whether or not a first condition is met where the matching score of the partial sentence accepted by the grammatical rule is the best of the matching scores of all the partial sentences; a determination is made as to whether or not a second condition is met where the duration time of the input speech determined to coincide with the silent standard pattern is more than a predetermined time; and the time where the first and second conditions are both met is determined to be an end of speech.

Next, a speech endpoint detection apparatus according to a third aspect of the present invention comprises structure analysis means for searching a partial sentence acceptable by the grammatical rule from a partial sentence obtained from the result of matching input speech with a word standard pattern; matching score comparison means for determining whether or not the matching score of the partial sentence accepted by the grammatical rule is the best of the matching scores of all the partial sentences, from the matching score of the partial sentence obtained from the result of matching the input speech with the word standard pattern; silent duration time determination means for determining whether or not the duration time of input speech determined to coincide with the silent standard pattern is longer than a predetermined time, from the result of matching the input speech with the word standard pattern; and speech endpoint determination means for determining an end of speech when the matching score of the partial sentence accepted by the grammatical rule is determined to be the best of the matching scores of all the partial sentences, and the silent duration time is determined to be longer than the predetermined time.

On the other hand, a speech endpoint detection apparatus according a fourth aspect of the present invention comprises matching score comparison means for searching a partial sentence of the best matching score from the partial sentence and its matching score obtained from the result of matching the input speech with the word standard pattern; structure analysis means for analyzing whether or not the partial sentence of the best matching score is accepted by the grammatical rule; silent duration time determination means for determining whether or not the duration time of input speech determined to coincide with the silent standard pattern is longer than a predetermined time, from the matching result of the input speech with the word standard pattern; and speech endpoint determination means for determining an end of speech when the partial sentence of the best matching score is determined to be a sentence accepted by the grammatical rule, and the silent duration time is determined to be longer than a predetermined time.

On the other hand, a continuous speech recognition method according to a fifth aspect of the present invention is characterized in that, speech recognition is started when a condition where the power of input speech exceeds a threshold value continues for more than a predetermined time; a determination is made as to whether or not a first condition is met where the matching score of partial sentence accepted by the grammatical rule is the best of the matching scores of all the partial sentences, from the individual partial sentence and its matching score obtained from the result of matching the input speech with the word standard pattern; a determination is made, from the result of matching the input speech with the word standard pattern, as to whether or not a second condition is met where the duration time of the input speech determined to coincide with the silent standard pattern is more than a predetermined time; and speech recognition is ended when the first and second conditions are both met.

Further, a continuous speech recognition method according to a sixth aspect of the present invention is characterized in that, speech recognition is started when the continuous speech recognition apparatus is started operation; a determination is made as to whether or not a first condition is met where the matching score of partial sentence accepted by the grammatical rule is the best of the matching scores of all the partial sentences, from the individual partial sentence and its matching score obtained from the result of matching the input speech with the word standard pattern; a determination is made, from the result of matching the input speech with the word standard pattern, as to whether or not a second condition is met where the duration time of the input speech determined to coincide with the silent standard pattern is more than a predetermined time; and speech recognition is ended when the first and second conditions are both met.

Next, a continuous speech recognition apparatus according to a seventh aspect of the present invention comprises speech startpoint detection means for determining whether or not the power of the input speech exceeds a threshold value for more than a predetermined time, and outputting a speech startpoint detection signal when the condition continues for more than the predetermined time; structure analysis means for searching a partial sentence accepted by the grammatical rule from the partial sentence obtained from the result of matching the input speech with the word standard pattern; matching score comparison means for determining whether or not the matching score of the partial sentence accepted by the grammatical rule is the best of the matching scores of all partial sentences, from the matching score of the partial sentence obtained from the result of matching the input speech with the word standard pattern; silent duration time determination means for determining whether or not the duration time of input speech determined to coincide with the silent standard pattern is longer than a predetermined time, from the result of matching the input speech with the word standard pattern; and speech endpoint determination means for determining an end of speech when the matching score of partial sentence accepted by the grammatical rule is determined to be the best of the matching scores of all the partial sentences, and the silent duration time is determined to be longer than the predetermined time; whereby speech recognition is started by an output of the speech startpoint detection signal, and speech recognition is ended by an output of the speech endpoint detection signal.

On the other hand, a continuous speech recognition apparatus according to an eighth aspect of the present invention comprises speech startpoint detection means for determining whether the power of the input speech exceeds a threshold value for more than a predetermined time, and outputting a speech startpoint detection signal when the condition continues for more than the predetermined time; matching score comparison means for searching a partial sentence of the best matching score from the partial sentence and its matching score obtained from the result of matching input speech with the word standard pattern; structure analysis means for analyzing whether or not the partial sentence of the best matching score is accepted by the grammatical rule; silent duration time determination means for determining whether or not the duration time of input speech determined to coincide with the silent standard pattern is longer than a predetermined time, from the result of matching the input speech with the word standard pattern; and speech endpoint determination means for outputting a speech endpoint detection signal when the partial sentence of the best matching score is determined to be a sentence acceptable to the grammatical rule, and the silent duration time is determined to be longer than the predetermined time, whereby speech recognition is started by an output of the speech startpoint detection signal, and speech recognition is ended by an output of the speech endpoint detection signal.

On the other hand, a continuous speech recognition apparatus according to a ninth aspect of the present invention comprises structure analysis means for searching a partial sentence accepted by the grammatical rule from the partial sentence obtained from the result of matching the input speech with the word standard pattern; matching score comparison means for determining whether or not the matching score of the partial sentence accepted by the grammatical rule is the best of the matching scores of all partial sentences, from the matching score of the partial sentence obtained from the result of matching the input speech with the word standard pattern; silent duration time determination means for determining whether or not the duration time of input speech determined to coincide with the silent standard pattern is longer than a predetermined time, from the result of matching the input speech with the word standard pattern; and speech endpoint determination means for outputting a speech endpoint detection signal when the matching score of partial sentence accepted by the grammatical rule is determined to be the best of the matching scores of all the partial sentences, and the silent duration time is determined to be longer than the predetermined time; wherein speech recognition is carried out from the starting of the apparatus until the speech endpoint detection signal is output.

On the other hand, a continuous speech recognition apparatus according to a tenth aspect of the present invention comprises matching score comparison means for searching a partial sentence of the best matching score from the partial sentence and matching score thereof obtained from a result of matching the input speech with the word standard pattern; structure analysis means for analyzing whether or not the partial sentence of the best matching score is acceptable by the grammatical rule; silent duration time determination means for determining whether or not a duration time of input speech determined to coincide with a silent standard pattern is longer than a predetermined time, from the result of matching the input speech with the word standard pattern; and speech endpoint determination means for outputting a speech endpoint detection signal when the partial sentence of the best matching score is determined to be a sentence acceptable to the grammatical rule, and the silent duration time is determined to be longer than the predetermined time; wherein speech recognition is carried out from the starting operation of the apparatus until the speech endpoint detection signal is output.

Since a silent condition continues when the user's speech ends, when the word standard pattern is continuously matched with the input speech using the grammatical rule having a silent part at the end of a sentence, a partial sentence and its matching score is obtained at every time as prediction and matching of words proceeds, when the user's speech ends, the matching score of the partial sentence accepted by the grammatical rule is the best of the matching scores of all the partial sentences, and the input speech determined to coincide with the silent standard pattern continues for more than a predetermined time.

Then, a speech endpoint can be determined using the matching score of the partial sentence and the result of the structure analysis obtained from the result of matching the input speech with the word standard pattern and the duration time of input speech determined to coincide with the silent standard pattern. This thereby reduces mis-detection as an end of speech period even if there is a long silent period in the course of a sentence. Further, specifically, a determination is made as to whether or not a first condition is met where the matching score of the partial sentence accepted by the grammatical rule is the best of the matching scores of all the partial sentences, and a determination is made as to whether or not a second condition is met where the duration time of input speech determined to coincide with the silent standard pattern is longer than a predetermined time, whereby the time when the first and second condition are both met is determined to be the end of speech.

Whether or not the first condition is met can be determined by searching a partial sentence accepted by the grammatical rule from the partial sentence obtained by the result of matching the input speech with the word standard pattern, and determining whether or not the matching score of the partial sentence accepted by the grammatical rule is the best of the matching scores of all the partial sentences from the matching score of the partial sentence obtained from the result of matching the partial sentence accepted by the grammatical rule, or by searching a partial sentence of the best matching score from the partial sentence and its matching score obtained from the result of the input speech with the word standard pattern, and analyzing whether or not the partial sentence of the best matching score is a sentence acceptable to the grammatical rule. Both methods are equivalent to each other.

Since, by applying the above speech endpoint detection method or apparatus in continuous speech recognition, speech recognition can be continued even when there is a long silent period in the sentence, thereby improving the performance of continuous speech recognition. Further, conventional speech startpoint detection based on power of speech may be made, or speech recognition processing such as word prediction or matching may be started from the time when the apparatus is started without using the conventional speech startpoint detection. When the latter speech startpoint detection is not made, deterioration of recognition performance due to mis-detection of speech startpoint which was generated when the input speech level is low can be prevented.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a diagram showing an example of grammatical rule using network;

FIG. 5 is a schematic view showing the structure of the continuous speech recognition apparatus according to a second embodiment of the present invention;

DETAILED DESCRIPTION OF PREFERRED EMBODIMENTS

Figure 1:
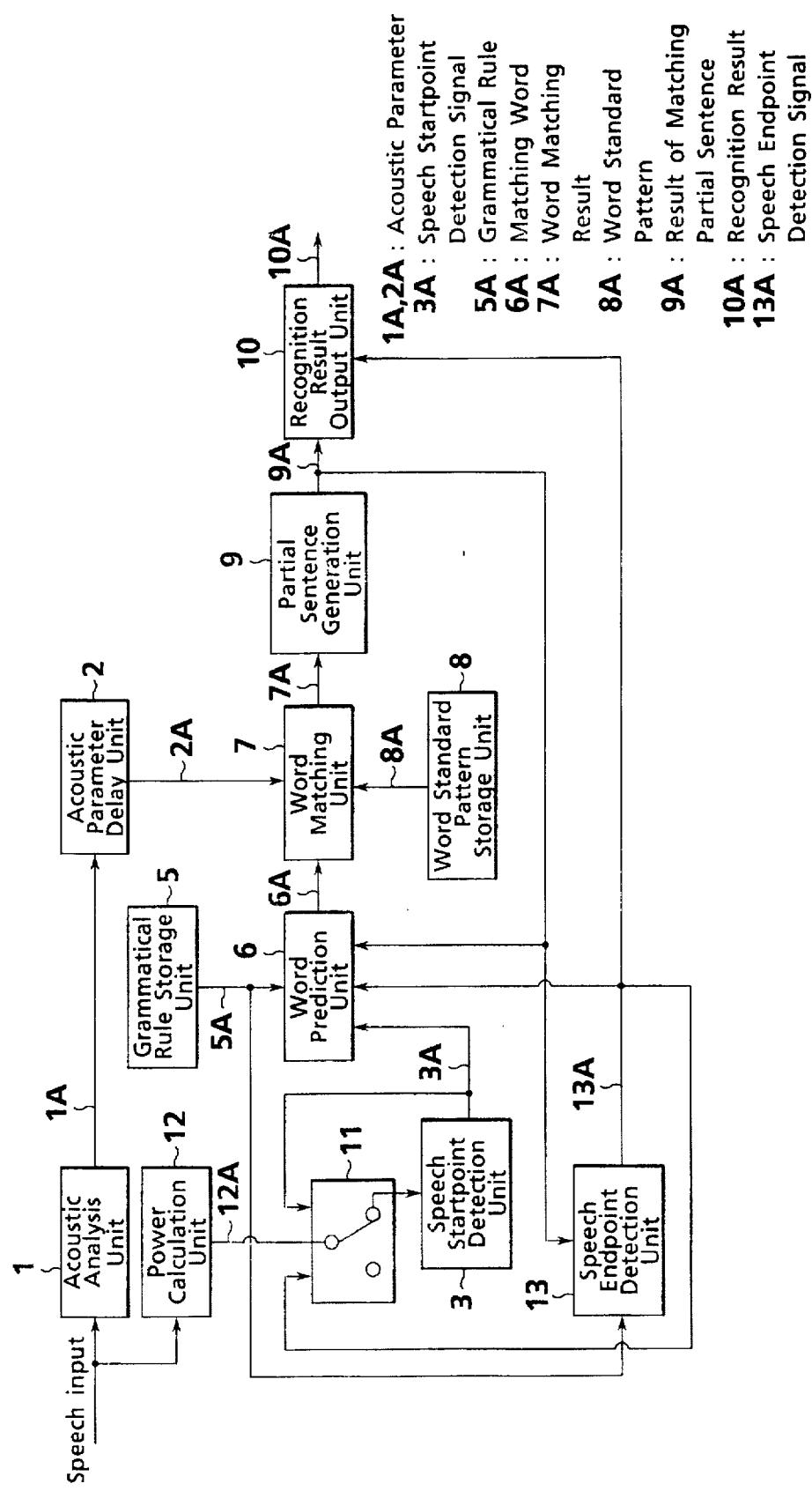
FIG. 1 is a schematic view showing the structure of the continuous speech recognition apparatus according to a first embodiment of the present invention.
Figure 3:
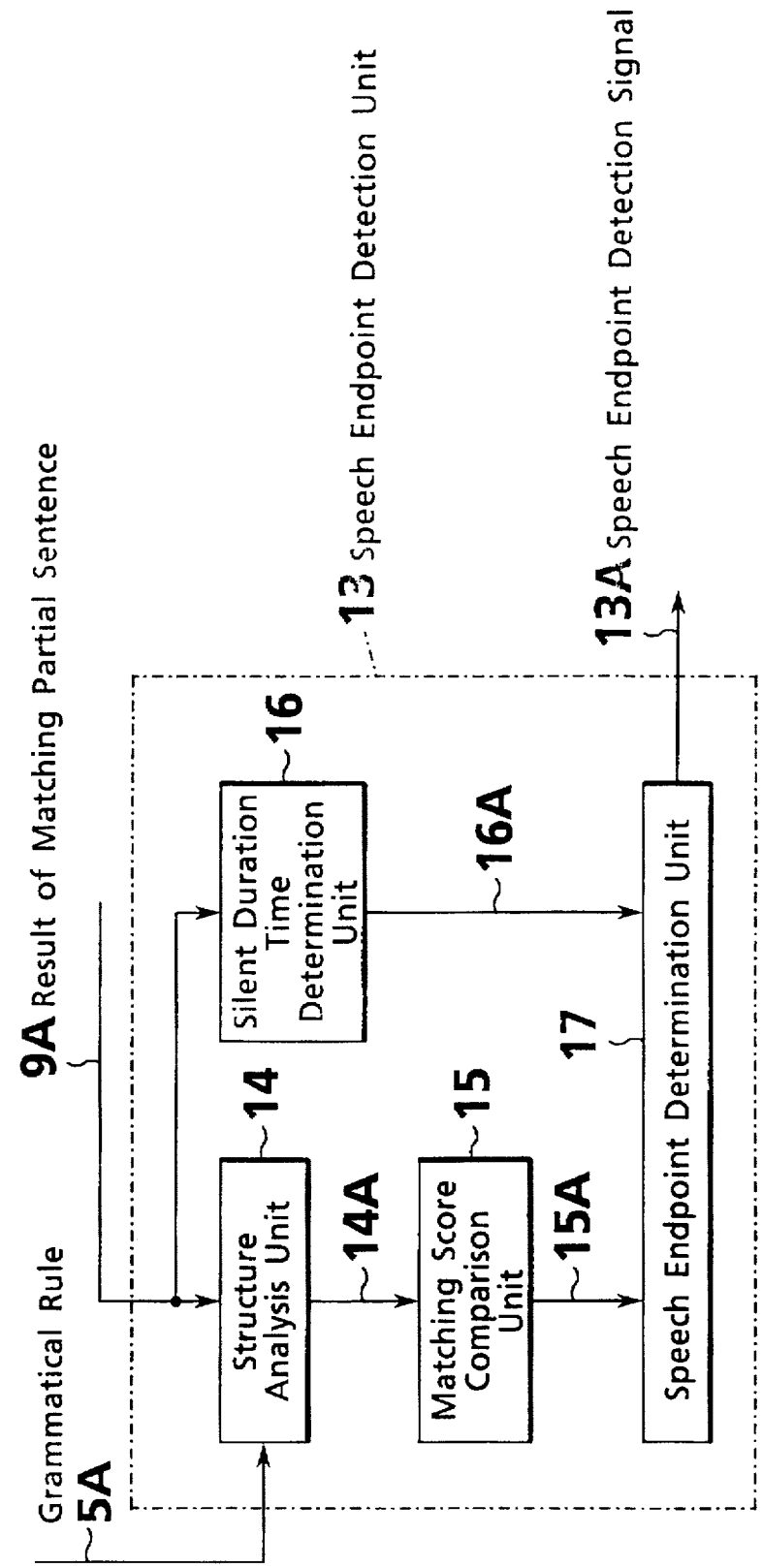
FIG. 3 is a schematic view showing the structure an embodiment of a speech endpoint detection unit.
Figure 4:
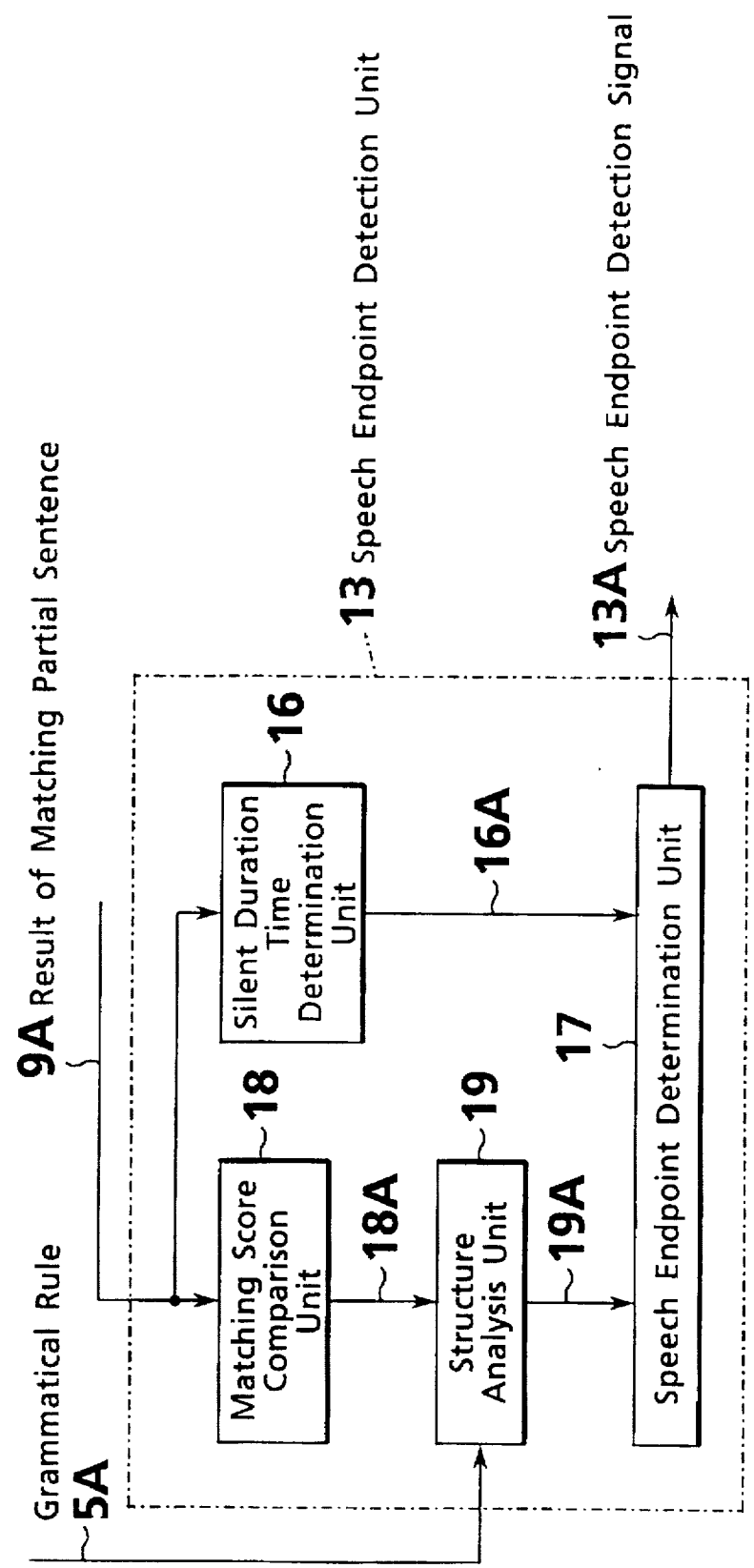
FIG. 4 is a schematic view showing the structure of another embodiment of a speech endpoint detection unit.
Figure 6A:
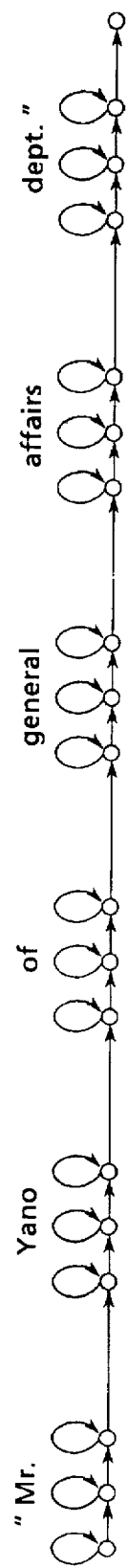
FIG. 6(a) is a diagram for explaining partial sentence and FIG. 6(b) is a diagram for explaining matching score calculation.
Figure 6B:
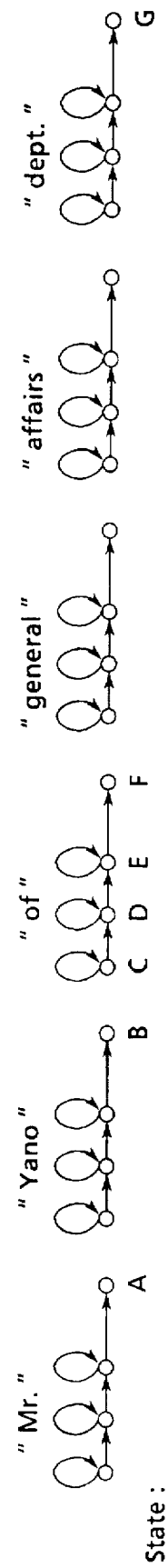
Figure 7:
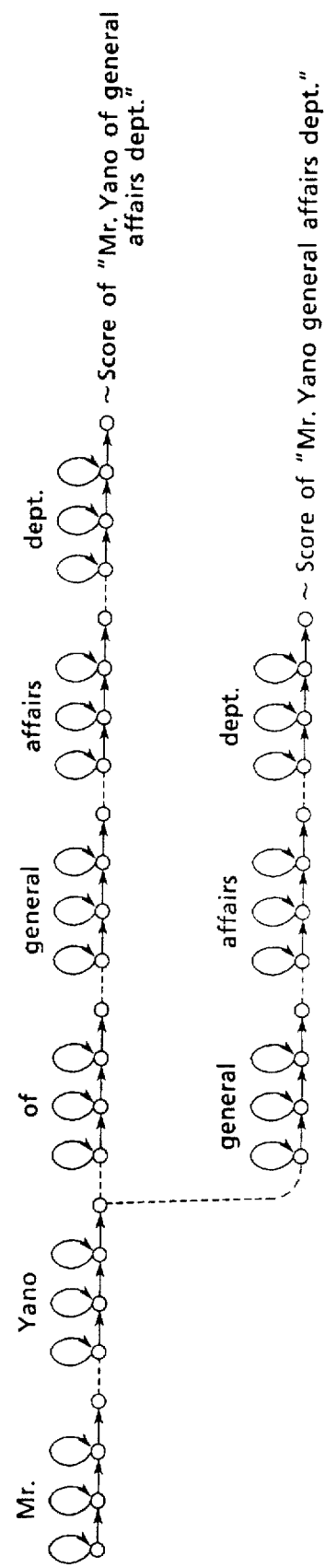
FIG. 7 is a diagram showing the relationship between partial sentence and matching score.

The present invention and embodiments thereof will be described with reference to the drawings. Of the drawings, FIG. 1 shows the structure of the continuous speech recognition apparatus according to the first embodiment of the present invention. FIG. 2 shows an example of the grammatical rule. FIG. 3 and FIG. 4 individually show the structure of the speech endpoint detection unit. FIG. 5 shows the structure of the continuous speech recognition apparatus according to the second embodiment of the present invention. FIG. 6(a) and FIG. 6(b) explain partial sentence and matching score calculation. FIG. 7 shows the relationship between partial sentence and matching score, and FIG. 8 explains silent duration time calculation.

First Embodiment

The continuous speech recognition apparatus shown in FIG. 1 detects speech startpoint using the power of input speech, but the end of speech (speech endpoint) is obtained from the result of matching the input speech with the word standard pattern. This applies a speech period detection method for making a determination utilizing the matching score of the partial sentence and the structure analysis result, and the duration time of input speech which is determined to coincide with the silent standard pattern. Specifically, the apparatus comprises an acoustic analysis unit 1, an acoustic parameter delay unit 2, a speech startpoint detection unit 3, a speech endpoint detection unit 13, a grammatical rule storage unit 5, a word prediction unit 6, a word matching unit 7, a word standard pattern storage unit 8, a partial sentence generation unit 9, a recognition result output unit 10, a speech period detecting switch 11, and a speech power calculation unit 12, and mainly achieved by a CPU and software.

In the continuous speech recognition apparatus shown in FIG. 1, the grammatical rule storage unit 5 previously stores grammatical rules having a silent part at the end of various sentences used for recognition. For example, in a built-in telephone reception system, various grammatical rules such as representing "Mr. Yano of the general affair dept. please (silence)" are provided. The example in FIG. 2 shows the grammatical rule using the network.

The word standard pattern storage unit 8, as in the past, previously stores standard patterns of all words appearing in various grammatical rules (in the example in FIG. 2, "Mr.", "Yano", "of", "general", "affairs", "dept.", "please", and (silence)). The switch 11 is first connected to the speech startpoint detection unit 3 at the starting of the apparatus, and at the time when the speech startpoint detection signal 3A is received from the speech startpoint detection unit 3, disconnected from the speech startpoint detection unit 3, and at the time when the speech endpoint detection signal 13A is received from the speech endpoint detection unit 13, connected to the speech startpoint detection unit 3.

Functions of the individual units of the continuous speech recognition apparatus shown in FIG. 1 will be described according to the speech recognition procedures.

The speech power calculation unit 12, moment by moment, calculates the power of input speech as in the past, and sends the result 12A to the switch 11.

As described above, the switch 11 is first connected to the speech startpoint detection unit 3, and sends the speech power calculation result 12A sent from the speech power calculation unit 12 to the speech startpoint detection unit 3. Thereafter, at the time the speech startpoint detection signal 3A is received from the speech startpoint detection unit 3, switch 11 is disconnected from the speech startpoint detection unit 3, and at the time the speech endpoint detection signal 13A is received from the speech endpoint detection signal 13, connected to the speech startpoint detection unit 3 to send again the speech power calculation result 12A to the speech startpoint detection unit 3.

Figure 10:
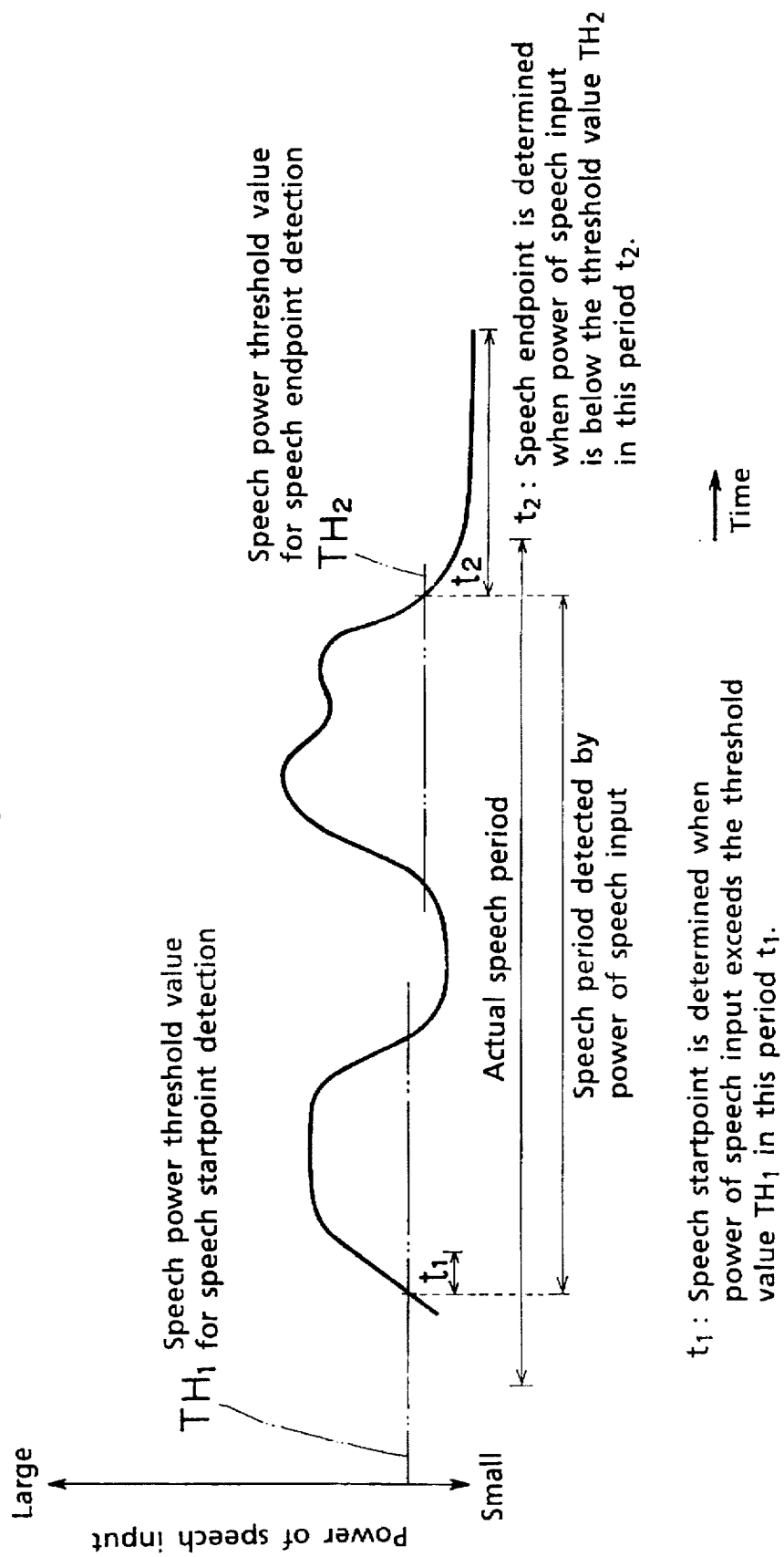
FIG. 10 is a diagram showing a prior art example of speech startpoint detection and speech endpoint detection using power of input speech.

As in the past, the speech startpoint detection unit 3 compares the power of speech sent from the speech power calculation unit 12 through the switch 11 with a threshold value TH1 as shown in FIG. 10, and at the time when a condition where the threshold value TH1 is exceeded continues for more than a predetermined time t1, sends the speech startpoint detection signal 3A to the switch 11 and the word prediction unit 6.

The acoustic analysis unit 1, moment by moment, uses acoustic analysis to extract the characteristic parameter (acoustic parameter) of the input speech, and sends the result (acoustic parameter) 1A to the acoustic parameter delay unit 2.

The acoustic parameter delay unit 2 delays the acoustic parameter 1A sent from the acoustic analysis unit 1 by a time t1 required from actual speech startpoint by the user at the speech startpoint detection unit 3 until the speech startpoint detection signal 3A is transmitted, so that the recognition start time is in line with the speech startpoint time, and sends the result 2A to the word matching unit 7.

The word prediction unit 6 determines one or more words to be next matched in the word matching unit 7, that is, matching words 6A by prediction from the partial sentence matching result (partial sentence and its matching score) 9A sent from the partial sentence generation unit 9 and the grammatical rule 5A stored in the grammatical rule storage unit 5, and sends them 6A to the word matching unit 7. The words include a silent period.

The processing to determine the matching words 6A is started at the time when the speech startpoint detection signal 3A is received, and continued until the speech endpoint detection signal 13A is received from the speech endpoint detection unit 13, at which time the processing ends.

The word matching unit 7 takes out the word standard pattern corresponding to the matching word 6A received from the word prediction unit 6, that is, the word standard pattern 8A, from the word standard pattern storage unit 8, collates the delayed acoustic parameter 2A with the word standard pattern 8A, sends the word matching result 7A for the matching word 6A matched to the end of the word standard pattern 8A to the partial sentence generation unit 9.

The matching score calculation method used for the match in the word matching unit 7, as in the past, includes the known DP matching method and a method using the Hidden Markov Model (HMM).

When the Hidden Markov Model is used to calculate matching score, the matching score is calculated according to Formula 1.

[Formula 1]
$\alpha(t+1,j) = \max_i \{\alpha(t,i) + O(k(t),i \to j)\}$ where,
    k(t): input speech pattern at time t
    $\alpha(t,i)$: matching score of input speech pattern and a word standard pattern, at time t and in state i
    $O(k(t),i \to j)$: logarithm of probability of outputting input speech pattern k(t) at time t to transit from state i to state j
    max{ }: maximum value in { } for all i
    i: state capable of transiting to state j
    At each word matching start time $t_s$,
    in the top state j of word standard pattern:
    $\alpha(t_s,j)$ = matching score of a word that precedes
    for others : $\alpha(t_s,j) = -\infty$ (negative infinite)
    When matching of word is required again,
    at the top state j of word standard pattern,
    $\alpha(t_s,j) = \max\{\alpha(t,j)$, matching score of a word ahead of the word$\}$.

When the DP matching method is used in the matching score calculation, the matching score is calculated according to Formula 2.

[Formula 2]
$g(t,j) = \min_L \{g(t-1,j), g(t-1,j-1), \ldots, g(t-1,j-L)\} + d(t,j)$ where,
    k(t): input speech pattern at time t
    $k(t_s)$: input speech pattern at word matching start time $t_s$
    $k(t_s), k(t_2+1), \ldots, k(t)$: input pattern array from word matching start time $t_s$ to time t
    $\omega(1), \omega(2), \ldots, \omega(N)$: word standard pattern array of a word
    d(t,j): distance between input speech pattern k(t) and the j'th pattern $\omega(j)$ in the word standard pattern
    g(t,j): matching score of input speech pattern array $k(t_s) \ldots k(t)$ with word standard pattern array $\omega(1) \ldots \omega(j)$
    min { }: minimum value in { } for all L
    At each word matching start time $t_s$,
    in the top pattern $\omega(1)$ of word standard pattern array:
    $g(t_s,1)$ = matching score of a word that precedes
    for other patterns $\omega(j)(j \neq 1)$:
    $g(t_s,j) = \infty$ (infinite)
    When matching of word is required again,
    in the top pattern $\omega(1)$ of word standard pattern array:
    $g(t_s,1) = \min \{g(t_s-1,1) + d(t_s,1)$, score of a word ahead of the word$\}$.

In the partial sentence generation unit 9, each partial sentence and its matching score are determined from the word matching result 7A sent from the word matching unit 7, and the result 9A is sent to the word prediction unit 6, the speech endpoint detection unit 13, and the recognition result output unit 10.

Here, as to the grammatical rule shown in FIG. 2, there are seven sentences as partial sentences, "Mr.", "Mr. Yano", "Mr. Yano of", "Mr. Yano of general", "Mr. Yano of general affairs", "Mr. Yano of general affairs dept.", and "Mr. Yano of general affairs dept. please (silence)", and matching scores are determined for the individual sentences.

Here, generation of partial sentence and calculation of the matching score will be described with reference to an example using the HMM (Hidden Markov Model). First, for the matching score, for example, when "please" is predicted from the partial sentence "Mr. Yano of general affairs dept.", HMM "Mr.", "Yano", "of", "general", "affairs", "dept.", "please" of the individual words can be connected to make HMM of the partial sentence "Mr. Yano of general affairs dept. please", and the calculation of Formula 1 is performed to determine the matching score of the partial sentence "Mr. Yano of general affairs dept. please". Further, the partial sentence "Mr. Yano of general affairs dept. please" can be produced by storing the word array of "Mr.", "Yano", "of", "general", "affairs", "dept." and "please".

In Formula 1, the above matching score calculation processing is written for each word. That is, when, in FIG. 6(b), for example, it is written using six word HMM as shown in FIG. 6(b) instead of connecting HMM of the partial sentence of "Mr. Yano of general affairs dept." shown in FIG. 6(a), between words, for example, the score when the word "Yano" transits to the end state at each time t is compared with the top state C of the word "of" or the score when transiting to the top state C, and the larger is determined to be the matching score of the top state C of the word "of". Since this processing is repeatedly carried out as t+1, t+2, t+3, . . . , when matching of the word "of" is required again, the larger is adopted by comparing the scores.

However, when matching of the word "of" is first required, since the top state is not yet matched, the score of the end state B of the word "Yano" is unconditionally given as the score of the top state C of the word "of". Further, the scores of other states D, E, and F of the word "of" are set to $-\infty$ for initialization.

By making the score calculation as above, the score of the partial sentence "Mr. Yano of" is the matching score in the end state F of the word HMM "of", the matching score of the partial sentence "Mr. Yano" is the matching score in the end state B of the word HMM "Yano", and the matching score of the partial sentence "Mr. Yano of general affairs dept." is the matching score in the end state G of the word HMM "dept.".

By making the above matching score calculation, the partial sentence generation unit 9 is actually required to perform only correspondence of partial sentence to its matching score, for example, in the example shown in FIG. 7, correspondence of the partial sentence "Mr. Yano of general affairs dept." to its matching score, and correspondence of the partial sentence "Mr. Yano general affairs dept." to its matching score.

However, partial sentence is not always necessary to be maintained as an actual word array, and it is preferably maintained in the form which is easy to use for word prediction. As techniques used for word prediction, an Early method, an LR method, reference literature (Hirosato Nomura, "Basic technology of Natural Language Processing", Electronic Information Communication Society) is widely employed.

The above description is the processing when HMM is used, but generation of partial sentence and calculation of its matching score are similarly performed when the DP matching method is used.

The speech endpoint detection unit 13 determines an endpoint of speech using the matching score and the structure analysis result obtained from the result of matching input speech with the word standard pattern and duration time of input speech which is determined to coincide with the silent standard pattern. Specifically, the following two conditions are set, whether or not these two conditions are met is always checked, an end of user's speech is determined at the time when they are met, and the speech endpoint detection signal 13A is sent to the word prediction unit 6 and the recognition result output unit 10.

First condition: This condition is that the matching score of the partial sentence (for example, in the example shown in FIG. 2, "Mr. Yano of general affairs dept. please (silence) ") accepted by the recognition grammatical rule is the largest of matching scores of all the partial sentences.

Second condition: This condition is that the duration time of input speech determined to coincide with the silent standard pattern is longer than a predetermined time.

A practical structure of the speech endpoint detection unit 13 is exemplified in FIG. 3 or FIG. 4, in the example in FIG. 3, it comprises a structure analysis unit 14, a matching score comparison unit 15, a silent duration time determination unit 16, and a speech endpoint determination unit 17, and in the example in FIG. 4 comprises a matching score comparison unit 18, a structure analysis unit 19, the silent duration time determination unit 16, and the speech endpoint determination unit 17.

In the speech endpoint detection unit 13 shown in FIG. 3, each partial sentence of partial sentence matching result 9A obtained by the partial sentence generation unit 9 from the word matching result 7A of input speech with word standard pattern is first analyzed by the structure analysis unit 14, the partial sentence (in the example in FIG. 2, "Mr. Yano of general affairs dept. please (silence)") accepted by the grammatical rule 5A is always searched, and the result 14A is sent to the matching score comparison unit 15.

Next, the matching score comparison unit 15 compares matching scores of partial sentences determined to be accepted by the grammatical rule by the search of the structure analysis unit 14 to determine whether or not the matching score of the partial sentence is the largest of the matching scores of all the partial sentences of the partial sentence matching result 9A, and sends the result 15A to the speech endpoint determination unit 17.

Whether or not the first condition is met is checked by these structure analysis unit 14 and the matching score comparison unit 15.

In the speech endpoint detection unit 13 shown in FIG. 4, the matching score comparison unit 18 first compares the matching scores with each other from the individual partial sentences and their matching scores of the partial sentence matching result 9A obtained by the partial sentence generation unit 9 from the word matching result 7A of input speech with word standard pattern, always searches for the partial sentence having the largest matching score of all the partial sentences, and sends the result 18A to the structure analysis unit 19.

Next, the structure analysis unit 19 searches whether or not the partial sentence having the largest score searched by the matching score comparison unit 18 is the sentence (in the example of FIG. 2, "Mr. Yano of general affairs dept. (silence)") accepted by the grammatical rule 5A, and sends the result 19A to the speech end determination unit 17.

Whether or not the first condition is met is checked by the matching score comparison unit 18 and the structure analysis unit 19. That is, the first condition is met if the partial sentence of the largest matching score is acceptable by the grammatical rule.

In either case of FIG. 3 or FIG. 4, the silent duration time determination unit 16 always determines whether or nor the second condition is met, that is, the duration time of input speech determined to coincide with the silent standard pattern (in the example in FIG. 2, corresponding to (silence) at the end of the sentence) is longer than a predetermined time, from the matching result 9A obtained by the partial sentence generation unit 9 from the word result of matching input speech with the word standard pattern, and sends the result 16A to the speech endpoint determination unit 17.

Determination of the silent duration time will be described later.

For the speech endpoint determination unit 17 in either case of FIG. 3 or FIG. 4, an end of user's speech is determined when the first and second conditions are both met, and the speech endpoint detection signal 13A is output.

Next, determination of the silent duration time will be described.

First, when the matching score is calculated using the Hidden Markov Model (HMM) in the word matching unit 7 (see Formula 1), duration time of input speech which coincides with the silent standard pattern can be calculated by Formula 3 and Formula 4.

[Formula 3]
For other than the top state of silent standard pattern,
$begin(t+1,j) = begin(t,j)$
    when $\alpha(t,j)+O(k(t),j \to j) \geq \alpha(t,m)+O(k(t), m \to j)$
$begin(t+1,j) = begin(t,m)$
    when $\alpha(t,j)+O(k(t),j \to j) < (t,m)+O(k(t), m \to j)$
For the top state of silent standard pattern
    When word matching is first required,
    $begin(t+1,j) = $ present time
    Thereafter
    $begin(t+1,j) = begin(t,j)$
        when $\alpha(t+1,j) \geq$ [matching score of a word ahead of silence]
    $begin(t+1,j) = $ present time
        when $\alpha(t+1,j) <$ [matching score of a word ahead of silence]
wherein begin(t,j):   matching start time when matching advances to the state j of silent standard pattern at time t
    m:    all states transitable to state j, with j itself removed.

[Formula 4]
[Duration time of input speech coinciding with silent standard pattern] = [present time] − begin(present time, end state of silent standard pattern)

When the matching score is calculated using the DP matching method in the word matching unit 7 (see Formula 2), duration time of input speech which coincides with the silent standard pattern can be calculated by Formula 5 and Formula 6.

[Formula 5]
For $j \neq 1$,
$begin(t+1,j) = begin(j,j)$
$\hat{j} = \underset{(j-N)}{\mathrm{argmin}} \left\{ \begin{array}{l} g(t,j) \\ g(t,j-1) \\ \vdots \\ g(t,j-N) \end{array} \right.$
argmin { } is x to minimize the value in { }
x For $j = 1$,
    When word matching is first required,
    $begin(t+1,j) = $ present time
    thereafter
    $begin(t+1,j) = begin(t,1)$
        when $g(t+1,j) \geq$ [matching score of a word ahead of silence]
    $begin(t+1,j) = $ present time
        when $g(t+1,1) <$ [matching score of a word ahead of silence]
wherein, begin(t,j):   matching start time when matching advances to the j'th pattern ω(j) of silent standard pattern array at time t.

[Formula 6]
[Duration time of input speech coinciding with silent

-continued

```
standard pattern] = [present time] -begin(present time,
                    last of silent standard pattern array)
```

There are words "end state" of silent standard pattern in Formula 4, and "last" of silent standard pattern array in Formula 6. However, silent model is represented not only by a single state or single pattern, but it may be represented by "a plurality of states" or "a plurality of patterns".

Figure 8:
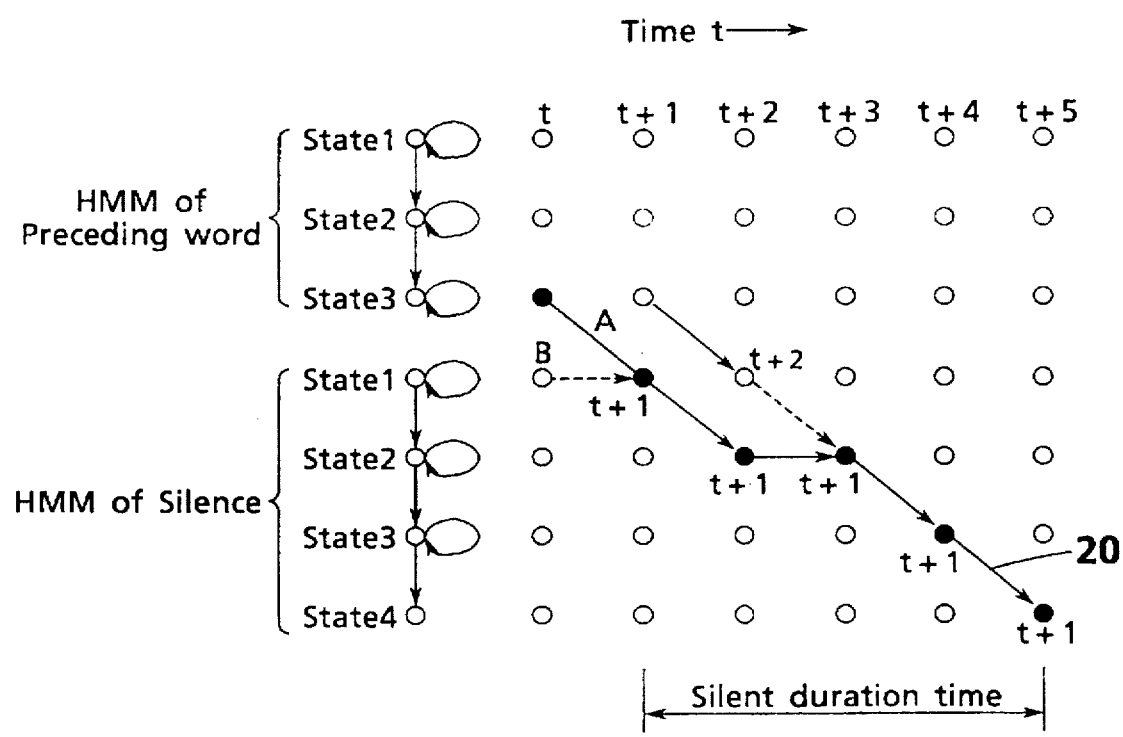
FIG. 8 is a diagram for explaining silent duration time calculation.
Figure 9:
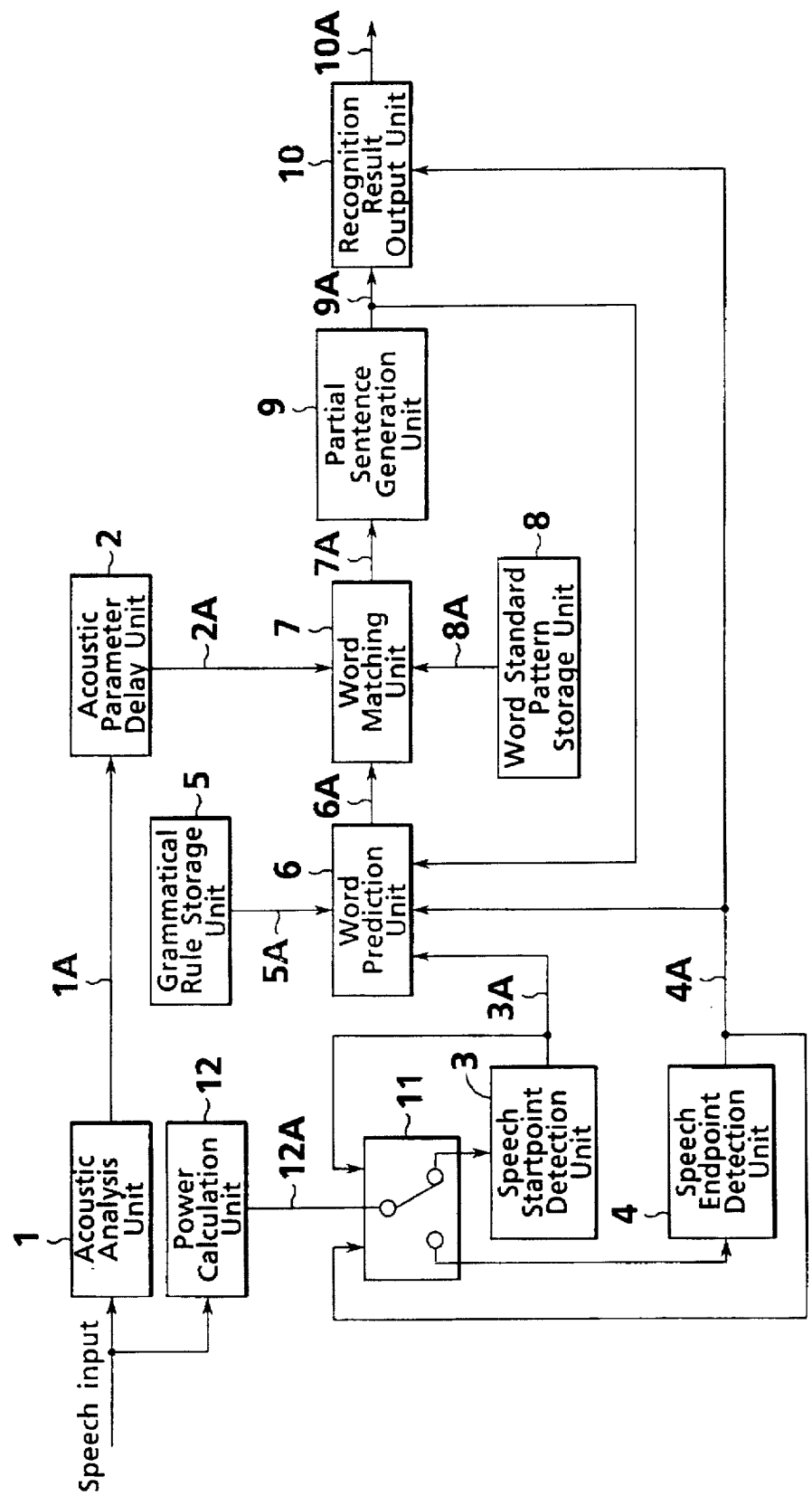
FIG. 9 is a schematic view showing the structure of a prior art continuous speech recognition apparatus.

An example of silent duration time calculation using HMM in the example of FIG. 8 will be described. When the matching score in the path 20 shown in FIG. 9 is the highest, it may be determined as to when the matching to state 4 of silent HMM at time t+5 is started.

First, considering the silent top state 1, when the score of transition A from the former word is higher than the score of transition B from itself, the time t+1 is stored. That is, begin(t+1, state 1)=t+1.

For other than the top state 1, the time maintained at the state transition source of the highest matching score is handed over. For example, begin (t+3, state 2)=begin (t+2, state 2).

This processing can be repeated to know when matching is started in the path 20 which gives the highest matching score when matching to the state 4 of silent HMM at each time. From the above, in the example of FIG. 8, silent duration time at time t+5 is [t+5–begin (t+5, state 4)]

The above calculation example of silent duration time is for when HMM is used, and similar consideration is applied to the Calculation by Formula 5 and Formula 6 using the DP matching method.

The recognition result output unit 10, after the speech endpoint detection signal 13A is received from the speech endpoint detection unit 13, outputs the sentence of the highest matching score as the recognition result 10A, among all the partial sentence matching results 9A sent from the partial sentence generation unit 9, for example at the time of reception.

Since the above-described first embodiment utilizes a threshold value of power of speech for the detection of speech, but for the detection of speech endpoint, utilizes the matching score of partial sentence and the structure analysis result obtained from the result of matching input speech with the word standard pattern and the duration time of input speech determined to coincide with the silent standard pattern, rather than the threshold value of the speech power, it is possible to reduce a detection error in that an end of speech period is determined when there is a long silent period in the sentence, thereby improving the performance of continuous speech recognition.

Here, operation of the continuous speech recognition apparatus of the first embodiment (FIG. 1) will be described with reference of the grammatical rule shown in FIG. 2. As described above, FIG. 2 shows a grammatical rule representing "Mr. Yano of general affairs dept. please (silence)" using a network.

After the apparatus starts operation, when the power of input speech exceeds a threshold value continuously for a predetermined time, the speech startpoint signal 3A is sent to the word prediction unit 6 and the switch 11, and estimation of matching word is carried out using the grammatical rule of FIG. 2. When the grammatical rule is used, the word "Mr." is predicted at the top of the sentence, and subsequently the word "Yano" is estimated from the partial sentence "Mr.", the word "of" from the partial sentence "Mr. Yano", and the word "general" from the partial sentence "Mr. Yano of",—and finally (silence) is estimated from the partial sentence "Mr. Yano of general affairs dept. please".

Further, in the grammatical rule of FIG. 2, only the partial sentence "Mr. Yano of general affairs dept. please (silence)" is acceptable.

When continuous speech recognition is made using the grammatical rule of FIG. 2, as prediction and matching score of words advances, the partial sentence "Mr.", "Mr. Yano", "Mr. Yano of", "Mr. Yano of general", "Mr. Yano of general affairs", "Mr. Yano of general affairs dept.", "Mr. Yano of general affairs dept. please", "Mr. Yano of general affairs dept. please (silence)", and the individual matching scores thereof are obtained in the partial sentence generation unit 9 at every time.

To detect the speech endpoint at each time the partial sentence and its matching score are obtained, two conditions are checked:

First condition: whether the matching score of the partial sentence "Mr. Yano of general affairs dept. please (silence)" accepted by the grammatical rule is the largest of the matching scores of all the partial sentences, and Second condition: whether the duration time of input speech determined to coincide with the standard pattern of the (silence) at the last of the partial sentence "Mr. Yano of general affairs dept. please (silence)" is longer than a predetermined time, an end of the user's speech is determined when the conditions are both met, the speech endpoint detection signal 13A is output to the word prediction unit 6, the recognition result output unit 10, and the switch 11.

When the speech endpoint detection signal 13A is output, word prediction and word matching are ended, and the recognition result output unit 10 outputs the partial sentence of the largest score of the partial sentence matching result 9A as the recognition result 10A. This completes continuous speech recognition.

Further, the switch 11 is connected to the speech startpoint detection unit 3 and waits for starting continuous speech recognition to the next input speech.

Second Embodiment

The continuous speech recognition apparatus shown in FIG. 5 does not perform speech startpoint detection, but instead starts speech recognition processing such as word prediction and matching from the starting operation of the apparatus, makes speech endpoint detection utilizing the matching score of partial sentence and structure analysis result obtained from the result of matching input speech with word standard pattern to complete speech recognition in processing at the time speech endpoint detection is made, and starts speech recognition processing for the next input speech.

Compared with the continuous speech recognition apparatus of the first embodiment shown in FIG. 1, the apparatus of the second embodiment shown in FIG. 5 does not include the speech period detection switch 11, the speech startpoint detection unit 3, and the acoustic parameter delay unit 2, and the acoustic parameter 1A obtained by the acoustic analysis unit i is sent, as is, to the word matching unit 7.

That is, in FIG. 5, the continuous speech recognition apparatus comprises the acoustic analysis unit 1, the speech endpoint detection unit 13, the grammatical rule storage unit 5, the word prediction unit 6, the word matching unit 7, the word standard pattern storage unit 8, the partial sentence generation unit 9, and the recognition result output unit 10, and mainly achieved by the CPU and software.

Referring to FIG. 5, as in the first embodiment, the grammatical rule storage unit 5 previously stores grammatical rules having a silence at the end of various sentences used for recognition. Further, the word standard pattern storage unit 8, as in the past, previously stores standard patterns of all words appearing in various grammatical rules.

According to the procedure of speech recognition, the functions of the individual units of the continuous speech recognition apparatus shown in FIG. 5 will be described.

The acoustic analysis unit 1 makes moment by moment acoustic analysis to extract characteristic parameters (acoustic parameters) of input speech, and sends the result 1A to the word matching unit 7.

The word prediction unit 6, at the same time the apparatus starts operation, starts word prediction, and predicts one or more words to be next matched, that is, matching words 6A, from the partial sentence matching result (partial sentence and its matching score) 9A sent from the partial sentence generation unit 9 and the grammatical rule 5A stored in the grammatical rule storage unit 5, and sends them 6A to the word matching unit 7. When the speech endpoint detection signal 13A is received from the speech endpoint detection unit 13, word prediction processing is ended, and word prediction for the next input speech begins. The words also include a silence pattern.

The word matching unit 7, as in the first embodiment, takes out a word standard pattern corresponding to the matching word 6A received from the word prediction unit 6, that is, the word standard pattern 8A, collates the acoustic parameter 1A with the word standard pattern 8A, and for the matching word 6A matching to the end of the word standard pattern 8A, sends the word matching result 7A to the partial sentence generation unit 9.

The matching score calculation method used for the matching in the word matching unit 7, as in the past, includes the known DP matching method and the method using Hidden Markov Model (HMM). When the Hidden Markov Model is used to calculate matching score, the matching score is calculated according to the above-described Formula 1. When the DP matching method is used in the matching score calculation, the matching score is calculated according to the Formula 2.

The partial sentence generation unit 9, as in the first embodiment, determines each partial sentence and its matching score from the word matching result 7A sent from the word matching unit 7, and sends the result 9A to the word prediction unit 6, the speech endpoint detection unit 13, and the recognition result output unit 10.

The speech endpoint detection unit 13, as in the first embodiment, is to determine an end of speech using the matching score of the partial sentence and the structure analysis result obtained from the result of matching input speech with the word standard pattern and the duration time of input speech determined to coincide with the silent standard pattern. Specifically, the following two conditions are determined, and whether or not the two conditions are met is always checked, and when the conditions are met, an end of speech is determined to send the speech endpoint detection signal 13A to the word prediction unit 6 and the recognition result output unit 10.

First condition: The matching score of the partial sentence accepted by the recognition grammatical rule (in the example of FIG. 2, "Mr. Yano of general affairs dept. please (silence)" is the largest of matching scores of all the partial sentences.

Second condition: The duration time of input speech determined to coincide with the silent standard pattern is longer than a predetermined time.

A practical example of the speech endpoint detection unit 13 is shown in FIG. 3 or FIG. 4, of which the structure and function are as described in the first embodiment.

Determination of the silent duration time is also similar to that in the first embodiment.

First, when the matching score is calculated using the Hidden Markov Model (HMM) in the word matching unit 7 (Formula 1), the duration time of input speech coinciding with the silent standard pattern can be calculated according to the above-described Formula 3 and Formula 4.

When the matching score is calculated using the DP matching method in the word matching unit 7 (Formula 2), the duration time of input speech coinciding with the silent standard pattern can be calculated according to the above Formula 5 and Formula 6.

The recognition result output unit 10, as in the first embodiment, after the speech endpoint detection signal 13A is received from the speech endpoint detection unit 13, outputs a sentence of the largest matching score of all the partial sentence matching results 9A sent from the partial sentence generation unit 9 as the recognition result 10A.

As described above, since the second embodiment does not make speech startpoint detection based on the speech power, but starts recognition processing such as prediction and matching of word from the time the apparatus starts operation, as compared with the first embodiment, deterioration of recognition performance due to a speech startpoint detection error generated when the input speech level is low can be improved, thereby improving the recognition performance. Further, as in the first embodiment, since the second embodiment also utilizes the matching score of partial sentence and structure analysis result obtained from the result of matching input speech with the word standard pattern and the duration time of input speech determined to coincide with the silent standard pattern, it is possible to reduce detection error in that an end of speech period is determined when there is a long silent period in the sentence, thereby improving the performance of continuous speech recognition.

Further, since speech startpoint detection is not made, when a cough, a breath, a noise, or the like is input at a low level before starting speech of a sentence, there may be a possibility that the speech is matched to output a wrong recognition result.

Operation of the continuous speech recognition apparatus of the second embodiment (FIG. 5) will be described with reference to the grammatical rule shown in FIG. 2. As described above, FIG. 2 shows the grammatical rule representing "Mr.. Yano of general affairs dept. please (silence)" using a network.

From the time the apparatus starts operation, prediction of matching word is made using the grammatical rule shown in FIG. 2. When this grammatical rule is used, the word "Mr." is predicted at the top of the sentence, subsequently the word "Yano" is predicted from the partial sentence "Mr.", the word "of" from the partial sentence "Mr. Yano", the word "general" from the partial sentence "Mr. Yano of",—and the word "please" from the partial sentence "Mr. Yano of general affairs dept.", and finally, (silence) is predicted from the partial sentence "Mr. Yano of general affairs dept. please".

In the grammatical rule of FIG. 2, only the partial sentence "Mr. Yano of general affairs dept. please (silence)" is acceptable.

When continuous speech recognition is made using the grammatical rule shown in FIG. 2, as prediction and matching of words advances, the partial sentences "Mr.", "Mr. Yano",—"Mr. Yano of general affairs dept. please", and "Mr. Yano of general affairs dept. please (silence)" and the individual matching scores are obtained at each time in the partial sentence generation unit 9.

Each time a partial sentence and its matching score are obtained, to detect the speech endpoint, the following two conditions are checked.

First condition: the matching score of the partial sentence "Mr. Yano of general affairs dept. please (silence)" accepted by the grammatical rule is the best of matching scores of all the partial sentences; and Second condition: the duration time of input speech coinciding with the standard pattern of "(silence)" at the end of the partial sentence "Mr. Yano of general affairs dept. please (silence)" is longer than a predetermined time, are checked, an end of user's speech is determined when both conditions are met, and the speech endpoint detection signal 13A is output to the word prediction unit 6 and the recognition result output unit 10.

When the speech endpoint detection signal 13A is output, word prediction and word matching are ended, and the recognition result output unit 10 outputs the partial sentence of the best matching score of the partial sentence result 9A as the recognition result 10A. This completes continuous speech recognition.

Further, at the same time, the word prediction unit 6 starts prediction for continuous speech recognition of the next input speech.

With the speech endpoint detection method of the present invention, since an end of user's speech is determined to detect the speech endpoint utilizing the result of matching input speech with the word standard pattern, rather than from the power of the input speech, a detection error of speech period which tends to be generated in the conventional method and apparatus when the level of input speech is low, especially an end of speech period is determined even in the course of a sentence when a long silent period occurs in the sentence, can be reduced.

Further, with the continuous speech recognition system of the first embodiment, since the speech startpoint is detected according to the power of matching input speech to start speech recognition processing and the speech endpoint is detected utilizing the result of matching input speech with the word standard pattern, an error in the conventional system in that part of input sentence is matched with the standard pattern of the entire sentence is eliminated even when there is a long silent period in the sentence, thereby improving the performance of continuous speech recognition.

Still further, with the continuous speech recognition system of the second embodiment, since the speech startpoint detection is not made according to the power of matching input speech, but speech recognition is started from the time when the apparatus starts operation and speech recognition is continued until speech endpoint is detected utilizing input speech and word standard patterns, deterioration of speech recognition performance due to the speech startpoint detection error generated in the conventional system when the level of input speech is low, can be reduced, and an error caused when part of input sentence is matched with the standard pattern of the entire input sentence is eliminated even when there is a long silent period in the sentence, thereby even further improving the performance of continuous speech recognition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speech endpoint detection method used in a continuous speech recognition process which recognizes continuous speech by continuously matching an input speech with word standard patterns according to a grammatical rule, said method comprising the steps of:

checking a matching score and structure of a partial sentence obtained by matching the input speech with the word standard patterns;

determining a duration time of an input speech determined to coincide with a silent standard pattern; and judging an end of speech based on said checking and determining steps.

2. The method according to claim 1, wherein the continuous speech recognition process is performed by a speech recognition apparatus.

3. A speech endpoint detection method comprising the steps of:

continuously matching an input speech with word standard patterns according to a grammatical rule;

determining partial sentences and corresponding matching scores by matching the input speech with the word standard patterns;

determining whether or not a first condition is met depending on whether the matching score of a partial sentence accepted by the grammatical rule is the best of all partial sentences;

determining whether or not a second condition is met depending on whether a duration time of an input speech determined to coincide with a silent standard pattern is more than a predetermined time; and determining a time at which the first and second conditions are both met as an end of speech.

4. A continuous speech recognition apparatus for recognizing a continuous speech by continuously matching an input speech with word standard patterns according to a grammatical rule, comprising:

structure analysis means for searching for a partial sentence which is acceptable by the grammatical rule from partial sentences obtained by matching the input speech with the word standard patterns;

matching score comparison means for determining whether or not a matching score of the partial sentence accepted by the grammatical rule is the best matching score of all the partial sentences;

silent duration time determination means for determining whether or not a duration time of an input speech determined to coincide with a silent standard pattern is longer than a predetermined time, from the result of matching the input speech with the word standard patterns; and speech endpoint determination means for determining an end of speech when the matching score of a partial sentence accepted by the grammatical rule is determined to be the best of matching scores of all the partial sentences, and the silent duration of time is determined to be longer than the predetermined time.

5. A speech endpoint detection apparatus used in a continuous speech recognition apparatus for recognizing a continuous speech by continuously matching an input speech with word standard patterns according to a grammatical rule, comprising:

matching score comparison means for searching for a partial sentence having the best matching score from partial sentences and corresponding matching scores obtained by matching the input speech with word standard patterns;

structure analysis means for analyzing whether or not the partial sentence having the best matching score is accepted by the grammatical rule;

silent duration time determination means for determining whether or not a duration time of an input speech determined to coincide with a silent standard pattern is longer than a predetermined time, from the result of matching the input speech with the word standard patterns; and speech endpoint determination means for determining an end of speech when the partial sentence having the best matching score is determined to be a sentence accepted by the grammatical rule, and the silent duration time is determined to be longer than a predetermined time.

6. A continuous speech recognition method for recognizing continuous speech by continuously matching an input speech with word standard patterns according to a grammatical rule, said method comprising the steps of:

starting speech recognition when a power of input speech exceeds a threshold value for more than a predetermined time;

determining whether or not a first condition is met depending on whether a matching score of a partial sentence accepted by the grammatical rule is the best of matching scores of all partial sentences, from individual partial sentences and corresponding matching scores obtained by matching the input speech with the word standard patterns;

determining, based on the result of matching the input speech with the word standard patterns, whether or not a second condition is met depending on whether a duration time of an input speech determined to coincide with a silent standard pattern is more than a predetermined time; and ending speech recognition when the first and second conditions are both met.

7. A continuous speech recognition method used in a continuous speech recognition process for recognizing continuous speech by continuously matching an input speech with word standard patterns according to a grammatical rule, said method comprising the steps of:

starting speech recognition when the continuous speech recognition apparatus begins operation;

determining whether or not a first condition is met depending on whether the matching score of a partial sentence accepted by the grammatical rule is the best of matching scores of all partial sentences, from individual partial sentences and corresponding matching scores obtained by matching the input speech with the word standard patterns;

determining, from the result of matching the input speech with the word standard patterns, whether or not a second condition is met depending on whether a duration time of the input speech determined to coincide with a silent standard pattern is more than a predetermined time; and ending speech recognition when the first and second conditions are both met.

8. A continuous speech recognition apparatus for recognizing a continuous speech by continuously matching an input speech with word standard patterns according to a grammatical rule, comprising:

speech startpoint detection means for determining whether a power of the input speech exceeds a threshold value for more than a predetermined time, and outputting a speech startpoint detection signal when the condition continues for more than the predetermined time;

structure analysis means for searching for a partial sentence which is accepted by the grammatical rule from partial sentences obtained by matching the input speech with the word standard patterns;

matching score comparison means for determining whether or not a matching score of the partial sentence accepted by the grammatical rule is the best of all partial sentences, from matching scores of the partial sentences obtained by matching the input speech with the word standard patterns;

silent duration time determination means for determining whether or not a duration time of an input speech determined to coincide with a silent standard pattern is longer than a predetermined time, from the result of matching the input speech with the word standard patterns;

silent duration time determination means for determining whether or not a duration time of an input speech determined to coincide with a silent standard pattern is longer than a predetermined time, from the result of matching the input speech with the word standard patterns; and speech endpoint determination means for determining an end of speech when the matching score of a partial sentence accepted by the grammatical rule is determined to be the best of the matching scores of all the partial sentences, and the silent duration time is determined to be longer than the predetermined time, whereby speech recognition is started by the output of the speech startpoint detection signal, and speech recognition is ended by an output of a speech endpoint detection signal.

9. A continuous speech recognition apparatus for recognizing a continuous speech by continuously matching an input speech with word standard patterns according to a grammatical rule, comprising:

speech startpoint detection means for determining whether or not a power of the input speech exceeds a threshold value for more than a predetermined time, and outputting a speech startpoint detection signal when the power of the input speech exceeds the threshold value for more than the predetermined time;

matching score comparison means for searching for a partial sentence having the best matching score from partial sentences and corresponding matching scores obtained by matching the input speech with the word standard patterns;

structure analysis means for analyzing whether or not the partial sentence having the best matching score is accepted by the grammatical rule;

silent duration time determination means for determining whether or not a duration time of an input speech determined to coincide with a silent standard pattern is longer than a predetermined time, from the result of matching the input speech with the word standard patterns; and speech endpoint determination means for outputting a speech endpoint detection signal when the partial sentence having the best matching score is determined to be a sentence acceptable to the grammatical rule, and the silent duration time is determined to be longer than the predetermined time, whereby speech recognition is started by the output of the speech startpoint detection signal, and speech recognition is ended by the output of the speech endpoint detection signal.

10. A continuous speech recognition apparatus for recognizing a continuous speech by continuously matching an input speech with word standard patterns according to a grammatical rule, comprising:

structure analysis means for searching for a partial sentence which is accepted by the grammatical rule from partial sentences obtained by matching the input speech with the word standard patterns;

matching score comparison means for determining whether or not a matching score of the partial sentence accepted by the grammatical rule is the best of all partial sentences, from the matching scores of partial sentences obtained by matching the input speech with the word standard pattern;

silent duration time determination means for determining whether or nor a duration time of an input speech determined to coincide with a silent standard pattern is longer than a predetermined time, from the result of matching the input speech with the word standard patterns; and speech endpoint determination means for outputting a speech endpoint detection signal when the matching score of the partial sentence accepted by the grammatical rule is determined to be the best of all the partial sentences, and the silent duration time is determined to be longer than the predetermined time;

whereby speech recognition is carried out from the starting operation of the apparatus until the speech endpoint detection signal is output.

11. A continuous speech recognition apparatus for recognizing a continuous speech by continuously matching an input speech with word standard patterns according to a grammatical rule, comprising:

matching score comparison means for searching for a partial sentence having the best matching score from partial sentences and corresponding matching scores obtained by matching the input speech with the word standard patterns;

structure analysis means for analyzing whether or not the partial sentence having the best matching score is acceptable by the grammatical rule;

silent duration time determination means for determining whether or not a duration time of an input speech determined to coincide with a silent standard pattern is longer than a predetermined time, from the result of matching the input speech with the word standard patterns; and speech endpoint determination means for outputting a speech endpoint detection signal when the partial sentence having the best matching score is determined to be a sentence acceptable to the grammatical rule, and the silent duration time is determined to be longer than the predetermined time;

whereby speech recognition is carried out from the starting operation of the apparatus until the speech endpoint detection signal is output.

\* \* \* \* \*